United States Patent
Ertugrul et al.

(10) Patent No.: US 11,448,260 B2
(45) Date of Patent: Sep. 20, 2022

(54) DENTAL HAND PIECE OR ANGLE PIECE WITH A ROTATING TOOL

(71) Applicant: DENTSPLY SIRONA inc., York, PA (US)

(72) Inventors: Metin Ertugrul, Rodermark (DE); Matthias Rein, Lorsch (DE); Jan-Paul Schermuly, Darmstadt (DE); Ralf Sutter, Weinheim (DE)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/002,037

(22) Filed: Jun. 7, 2018

(65) Prior Publication Data

US 2018/0355914 A1    Dec. 13, 2018

(51) Int. Cl.
| | |
|---|---|
| *A61C 1/18* | (2006.01) |
| *F16C 19/16* | (2006.01) |
| *A61C 1/12* | (2006.01) |
| *A61C 1/06* | (2006.01) |
| *F16C 25/08* | (2006.01) |
| *F16C 19/54* | (2006.01) |
| *F16C 19/06* | (2006.01) |
| *F16C 33/66* | (2006.01) |

(52) U.S. Cl.
CPC ............ *F16C 19/16* (2013.01); *A61C 1/06* (2013.01); *A61C 1/12* (2013.01); *A61C 1/181* (2013.01); *F16C 19/547* (2013.01); *F16C 25/083* (2013.01); *F16C 19/06* (2013.01); *F16C 33/66* (2013.01); *F16C 2202/02* (2013.01); *F16C 2316/13* (2013.01); *F16C 2352/00* (2013.01)

(58) Field of Classification Search
CPC ... A61C 1/06; A61C 1/12; F16B 2/005; F16C 19/16; F16C 19/547; F16C 19/06; F16C 25/083; F16C 33/66; F16C 2202/02; F16C 2316/13; F16C 2352/00
USPC ................................................... 384/517, 537
See application file for complete search history.

(56) References Cited

U.S. PATENT DOCUMENTS

| | | | |
|---|---|---|---|
| 5,733,120 A | 3/1998 | Yao | |
| 6,116,108 A * | 9/2000 | Sturm | F16H 48/08 29/525 |
| 6,425,761 B1 * | 7/2002 | Eibofner | A61C 1/06 433/131 |

(Continued)

FOREIGN PATENT DOCUMENTS

EP    1069500 A1    1/2001

OTHER PUBLICATIONS

European Search Report dated Apr. 5, 2017.

*Primary Examiner* — Heidi M Eide
(74) *Attorney, Agent, or Firm* — Dentsply Sirona Inc.

(57) ABSTRACT

A dental hand piece or angle piece including a rotating tool, which is driven via a rotating drive element disposed in a housing, wherein the rotating drive element is mounted in the housing by a radial rolling bearing, wherein the rolling bearing comprises an axial abutment surface and the housing comprises an axial countersurface, and wherein the rolling bearing is axially preloaded with respect to the housing by a spring element 11 and has a coefficient of friction for the static friction of the abutment surface to the countersurface or the abutment surface and the countersurface to the spring element that is at least 0.16 in the lubricated state and at least 0.25 in the unlubricated state.

6 Claims, 2 Drawing Sheets

(56) References Cited

U.S. PATENT DOCUMENTS

| | | |
|---|---|---|
| 8,893,031 B2 | 11/2014 | Groves |
| 2008/0042503 A1* | 2/2008 | Hartkorn .................. H02K 1/28 |
| | | 310/90 |
| 2008/0261170 A1 | 10/2008 | Ploy |
| 2010/0248177 A1 | 9/2010 | Mangelberger |
| 2013/0046815 A1 | 2/2013 | Thomas |
| 2015/0064648 A1* | 3/2015 | Bierbaum .............. A61C 1/181 |
| | | 433/131 |
| 2017/0042639 A1 | 2/2017 | Tanaka |
| 2018/0021105 A1* | 1/2018 | Juillerat ................ A61C 1/141 |
| | | 433/103 |

\* cited by examiner

DENTAL HAND PIECE OR ANGLE PIECE WITH A ROTATING TOOL

TECHNICAL FIELD

Disclosed is a dental hand piece or angle piece comprising a rotating tool, which is driven via a rotating drive element disposed in a housing, wherein the rotating drive element is mounted in the housing by means of at least one radial rolling bearing, wherein the rolling bearing comprises an axial abutment surface and the housing comprises an axial countersurface, and wherein the rolling bearing is axially preloaded with respect to the housing by means of at least one spring, so that there is either direct contact of the axial abutment surface with the corresponding axial countersurface or contact of the axial abutment surface with the spring element and of the spring element with the corresponding axial countersurface.

BACKGROUND

In today's dental hand and angle pieces, the rotating drive elements are typically mounted with the aid of rolling bearings. The drive train of angle pieces often consists of three gear stages, also referred to in the following as a drive, namely the drive shaft with a coupling to the motor, an intermediate or neck drive, and a head drive with a clamping device for dental tools.

The rolling bearings are typically premounted on the respective drives, for example, by means of a radial press fit. The bearing outer rings are accommodated in the housing and are typically preloaded in axial direction with the aid of wave spring washers. Manufacturing-related tolerances always lead to a variability of the installation space of the drives. In an axial direction, the manufacturing tolerances lead to a variability in the axial preloading of the rolling bearings. In a radial direction, the manufacturing tolerances lead to a variability in the radial play, and thus to a potentially impaired tooth engagement in the gear stage. Both can have a significant impact on the service life of the rolling bearings and therefore have to be kept as low as possible.

The axial preload forces always lead to a frictional force transverse to the direction of rotation of the drive. These friction forces hold the head drive in position in the event of vibrations, thus preventing relative movements between the rolling bearing and the housing. The friction forces on the two rolling bearings depend, among other things, on the spring rate of the wave spring washer and on the preload distance.

The vibrations can have different causes. They may occur directly on the drill as a result of uneven removal in the course of preparation, or as a result of an existing imbalance of the drills or the head drives themselves. If the vibration is too strong, it can lead to a movement of the entire drive, including the rolling bearings, relative to the housing.

Increasing the axial preload forces of the rolling bearings can lead to an improvement. This is possible only to a very limited extent, however, because the recommended range for the bearing preload force is usually very narrow.

Reducing the manufacturing tolerances can lead to a reduction of the freedom of movement of the ball bearings and thus to an improvement. However, this can often only be achieved at great expense.

Also known as a method for reducing noise is the arrangement of rubber-elastic O-rings between the housing and the rolling bearing outer rings. The use of radially acting rubber-elastic O-rings can then lead to an attenuation of the vibrations, but requires significantly more space.

SUMMARY

The aim of the present disclosure is to counteract a reduced service life and an increased operating noise of the rolling bearings, such as are caused, for example, by loads resulting from vibrations.

In a dental hand piece or angle piece having a rotating tool, which is driven via a rotating drive element disposed in a housing, wherein the rotating drive element is mounted in the housing by means of at least one radial rolling bearing, wherein the rolling bearing comprises an axial abutment surface and the housing comprises an axial countersurface, and wherein the rolling bearing is axially preloaded with respect to the housing by means of at least one spring having axial contact surfaces, so that there is either direct contact of the axial abutment surface with the corresponding axial countersurface or contact of the axial abutment surface with the spring element and the corresponding axial countersurface, the coefficient of friction for the static friction of the abutment surface to the countersurface or the abutment surface and the countersurface to the axial contact surfaces of the spring element is at least 0.16 in the lubricated state and up to 0.30 in the unlubricated state. It is assumed that the coefficient of static friction is approximately equivalent to the coefficient of sliding friction.

The present disclosure specifically affects the influencing variable coefficient of friction, in particular the coefficient of static friction between the contact partners, such as, for example, between the rolling bearing outer ring and the housing, as well as the rolling bearing outer ring and the wave spring washer. As a result, stronger vibrations can be absorbed, and significant relative movements between the ball bearing and the housing can consequently be prevented or at least reduced.

The surfaces located in axial direction between the ball bearing outer rings and the housing, for example, are therefore roughened. Increasing the coefficient of friction requires little or no additional installation space.

Thus, for example, the end face of the rolling bearing outer ring, which is in contact with the housing, and the contact surface of the housing itself is roughened. As a result of the increased roughness, the transmissible frictional forces can be increased significantly while the axial preload of the rolling bearings remains the same.

According to an advantageous further development, the touching surfaces can be metallic, preferably made of steel. This has the advantage that known materials can be used for the rolling bearing, the housing and the spring element.

According to one advantageous further development, the touching surfaces can have a surface roughness Rz of at least 4.0 µm and/or a profile depth Pt of at least 8 µm, which leads to a coefficient of friction according to the present disclosure. In embodiments, Rz can be greater than or equal to 5 µm; such as Rz being in the range between 8.0 µm and 14.0 µm.

The coarsest turning without surface machining results in a surface roughness Rz remaining below Rz=4.0 µm. An Rz of approximately 5 µm to 6 µm is achieved by blasting with blasting balls; an Rz value of 12.5 µm to 13.0 µm can be achieved by blasting with corundum.

In particular when the components are too small to be able to determine Rz values, the profile depth Pt can be measured. A profile depth Pt of at least 8.0 µm, preferably of 12.0

μm-18.0 μm, has proven to be a suitable profile depth. The Pt values can be determined independently of the Rz values.

In terms of the present disclosure, the higher the Rz and Pt values the better. The surface roughness can nonetheless not be increased arbitrarily, because this leads to a deterioration of the component accuracy and this deterioration can adversely affect the desired result. A particularly favorable effect was achieved in the range specified for the Rz and Pt values.

According to one advantageous further development, the coefficient of friction can be provided by selecting the material partners as follows:
  metal/metal
  metal/ceramic
  ceramic/ceramic
  plastic/metal
  plastic/ceramic For the material partners metal/metal, an at least adequate increase in the coefficient of friction can be achieved in a simple and cost-effective manner by roughening the surfaces, even if the accuracy of the bearing arrangement is impaired slightly.

For the material partners metal/ceramic, a large increase in the coefficient of friction can be achieved in a cost-effective manner and with precise accuracy with the aid of a ceramic disc, even if the additional component makes handling more difficult.

Very high coefficients of friction can be achieved with the material partners ceramic/ceramic, but the components known per se are then composed of a material that has not yet been tested for these applications. However, one of ordinary skill in the art would understand that a ceramic/ceramic material pairing would be useful in the hand piece described herein.

For the material partners metal/plastic, a large increase in the coefficient of friction can be achieved in a simple and cost-effective manner with the aid of a plastic disc, but the accuracy of the bearing arrangement is significantly impaired and the service life is reduced by the creep behavior, which can lead to a loss of the preload on the bearing.

For the material partners metal/plastic, a large increase in the coefficient of friction can be achieved in a simple and cost-effective manner with the aid of a plastic coating, without adversely affecting the accuracy of the bearing arrangement as much as a disc would. However, the service life is still reduced by the creep behavior, which can lead to a loss of the preload on the bearing.

For the material partners plastic/ceramic, a large increase in the coefficient of friction can be achieved with the aid of components made of these materials, but the components known per se are then composed of a material that has not been adequately tested for these applications, the accuracy of the bearing arrangement is adversely affected and the service life is reduced by the creep behavior, which can lead to a loss of the preload on the bearing.

Despite all the disadvantages, an improvement of the known state of the art can be achieved with each of said pairings of material partners.

At least one of the touching surfaces can advantageously be formed as part of a coating with a higher coefficient of friction on a base material. In particular plastic or titanium can be used as the coating.

The rolling bearing can advantageously comprise an outer ring having an end face, which is configured as an abutment surface and is in contact with the countersurface of the housing, wherein both the abutment surface on the end face and the countersurface on the housing are roughened in comparison to the other axial surfaces, in particular the axial surfaces that are not located within the force flow.

In addition or as an alternative to the axial surfaces, radial surfaces too can have a coefficient of friction which is increased by roughening, for example the outer cylindrical lateral surface of the ball bearings. Under some circumstances, this can have production-related advantages because no distinction has to be made between the surfaces for roughening and, when roughening by blasting, there is no need for covering or isolating.

An intermediate element, in particular a wave spring washer, can advantageously be provided as a contact partner between the outer ring of the rolling bearing and the housing, which, across its contact surfaces, has a higher coefficient of friction with the abutment surface and the countersurface than the abutment surface and the countersurface have with one another.

A possible intermediate element is, for example, an adjustment washer or a spring washer or another type of disc, such as a friction disc, an adhesive disc or a brake disc.

The intermediate element can advantageously consist of a material having a higher coefficient of friction, in particular plastics or ceramic, on the axial contact surfaces with the abutment surface and the countersurface. The higher coefficient of friction can be achieved with the aid of increased surface roughness or the use of a coating.

BRIEF DESCRIPTION OF THE DRAWINGS

The method disclosed herein is explained with reference to the drawings.

DETAILED DESCRIPTION

Figure 1:
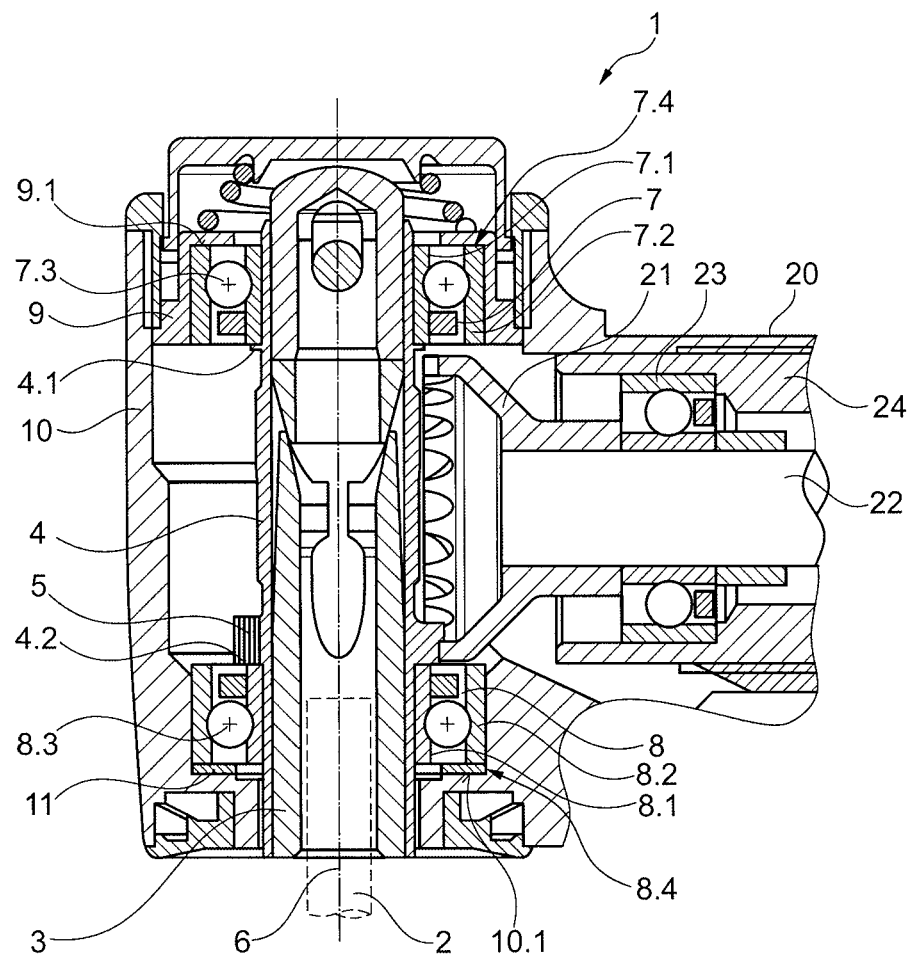
FIG. 1 depicts a longitudinal section of a head of a dental hand piece or angle piece with a tool rotating in a bearing arrangement.

FIG. 1 shows the head 1 of a hand piece or angle piece according to the present disclosure with a rotating tool 2 accommodated in a bearing arrangement.

The bearing arrangement comprises a hollow shaft 3, which accommodates the tool 2 and is connected to a drive element in the form of a sleeve 4 with an external toothing 5.

Viewed in the direction of a tool axis 6, the sleeve 4 is radially and axially mounted above and below the external toothing 5 by means of an upper rolling bearing 7 and a lower rolling bearing 8 arranged at an axial distance from said upper rolling bearing.

The upper rolling bearing 7 is mounted in a housing cover 9 which is connected to a head housing 10. The lower rolling bearing 8 is also mounted in this head housing 10 directly below the external toothing 5.

In each case one inner ring 7.1, 8.1 of the rolling bearing 7, 8 is fastened to the sleeve 4, approximately in radial direction by means of a press fit and in axial direction by contact with a radial collar 4.1, 4.2.

An outer ring 7.2, 8.2 of the rolling bearing 7, 8 is connected to the inner ring 7.1 via rolling elements 7.3, 8.3, 8.1 and the outer ring 7.2, 8.2 is radially mounted in the head cover 9 or housing 10 with radial play.

The outer rings 7.2, 8.2 of the rolling bearings 7, 8 are axially mounted via an axial abutment surface 7.4, 8.4 on the outer ring 7.2, 8.2, which, in the case of the upper rolling bearing 7, is directly, and in the case of the lower rolling bearing 8 indirectly, in contact with an axial countersurface 9.1, 10.1 in the head cover 9 or in the housing 10 with the interposition of a wave spring 11.

In addition to the head drive with the clamping device for the tool 2, the figure shows a neck drive 20, which, via a gearwheel 21 that is attached to a shaft 22, causes the rotation of the tool 2 held in the sleeve 4 by means of the external toothing 5. The shaft 22 is mounted in the housing 24 of the neck drive via a rolling bearing 23.

Figure 2:
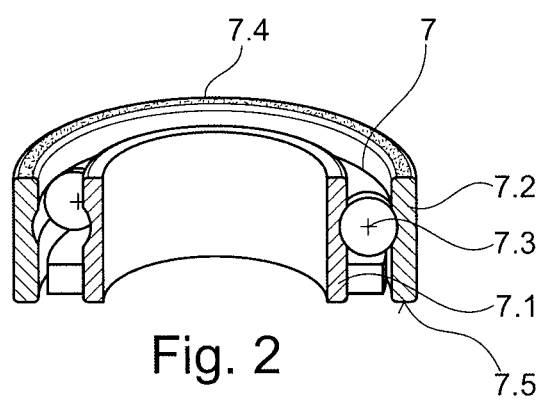
FIG. 2 depicts a detail view of an outer ring of a rolling bearing from FIG. 1.

FIG. 2 shows a detail view of the upper rolling bearing 7. The inner ring 7.1 is supported on the outer ring 7.2 by the rolling elements 7.3 and can transmit radial and axial forces via the rolling elements. On its outer ring 7.2, the outer ring 7.2 comprises an axial abutment surface 7.4, via which the axial forces acting on the rolling bearing are transmitted to a not depicted countersurface.

The coefficient of friction for a material pairing is a function of the type of machining of the surface, such as turning or grinding, and the state of lubrication, for example dry or oiled. To increase the coefficient of friction, the axial abutment surface 7.4, for example, is sand-blasted. The range for the coefficient of friction $\mu_H$ for the static friction of the material pairing steel-steel is changed by sandblasting from a range of approximately $0.08 < \mu_H < 0.2$ to $0.29 < \mu_H < 0.64$.

The friction value of an axial surface 7.5 not located within the axial force flow is not increased with respect to that of the abutment surface 7.2 by blasting.

In principle, several or all of the contact surfaces of the bearing arrangement oriented in the axial direction can be provided with an increased coefficient of friction by machining, to make the radial movement or the rotational movement of the movable components of the bearing arrangement more difficult.

It is also possible to coat one or more of the contact surfaces, shown here as a continuous black coloration of the abutment surface 7.4 in contrast to the base material of the outer ring 7.2.

Figure 3A:
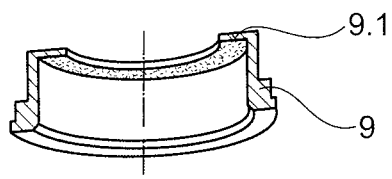
FIG. 3A-D depict a schematic exploded view of the bearing arrangement from FIG. 1.

FIGS. 3A-D show a schematic exploded view of the bearing arrangement from FIG. 1. FIG. 3A is a longitudinal section of the housing cover 9 in an oblique view toward the top, so that the axial countersurface 9.1 for the axial support of the upper rolling bearing 7 (FIG. 1) can be seen. The countersurface 9.1 is provided with an increased roughness, represented by the dots.

Figure 3B:
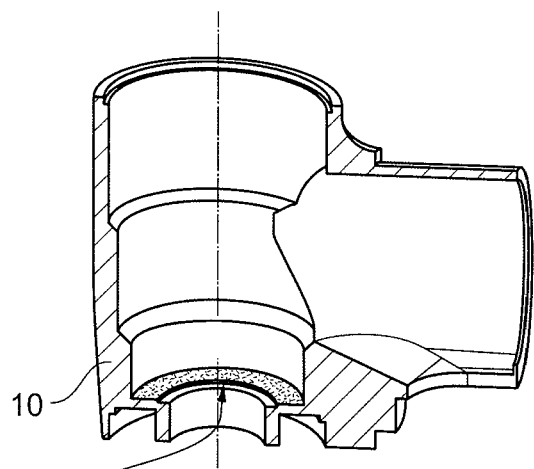

FIG. 3B is a longitudinal section of the housing 10 in an oblique view toward the bottom, so that the axial countersurface 10.1 for the axial support of the lower rolling bearing 8 (FIG. 1) can be seen. The countersurface 10.1, too, has an increased roughness.

Figure 3C:
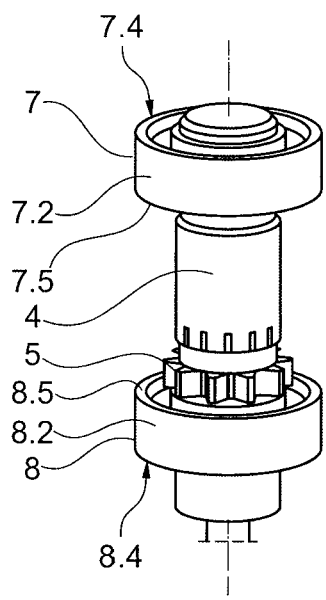

FIG. 3C shows the sleeve 4 with its external toothing 5, the lower rolling bearing 8 disposed below the external toothing 5 and the upper rolling bearing 7 disposed above and at a distance to the toothing. On the respective outer, i.e. facing away from one another, end faces of the outer rings 7.2, 8.2, the outer rings 7.2, 8.2 of the rolling bearings 7, 8 comprise abutment surfaces 7.4, 8.4 with increased roughness.

The end faces 7.5, 8.5 of the outer rings 7.2, 8.2, which face one another, are not used for the transmission of axial force, and therefore have a roughness that is predetermined by the customary production of the outer ring and are not subjected to any special treatment. These roughness values are typically in a range of $1.0\ \mu m <= Rz <= 3.0\ \mu m$ or the profile depth Pt is in a range of $3.0\ \mu m <= Pt <= 5.0\ \mu m$. If the surfaces are additionally ground to increase the precision, the Rz values are lower.

Figure 3D:
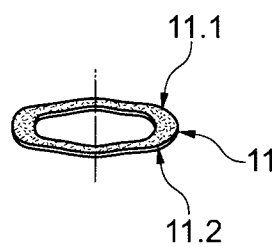

FIG. 3D shows a spring element 11 inserted between the lower rolling bearing of FIG. 3C and the housing 10 of FIG. 3B. Both the upper axial contact surface 11.1 facing the rolling bearing 8 and the lower contact surface 11.2 facing the housing 10 comprise an increased roughness.

This increased roughness in the design example according to FIGS. 3A-3D is achieved in that the profile depth of at least one of the contact surfaces is at least 8.0 μm, preferably 12 μm-18 μm.

Figure 4:
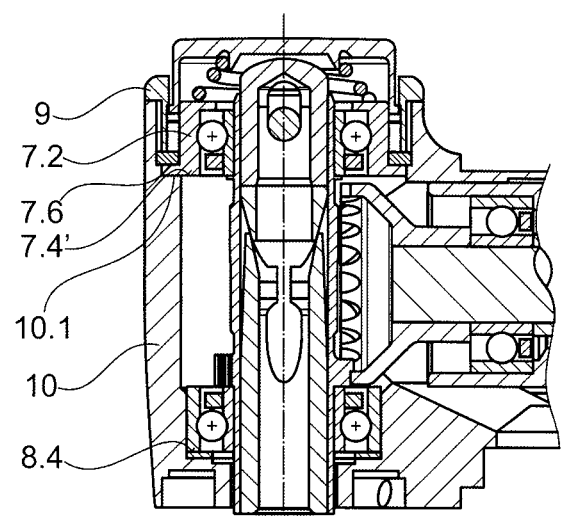
FIG. 4 depicts a sectional view of an alternative arrangement of an upper bearing.

FIG. 4 shows a per se known bearing arrangement of the upper rolling bearing 7', in which a downward directed surface of the upper rolling bearing 7' is the axial bearing surface 7.4' which is then roughened. The axial countersurface 10.1 on the housing 10 is likewise roughened. The axial bearing surface 7.4' is disposed on a flange 7.6, which is connected to the outer ring 7.2. The rolling bearing with flange is thus guided directly in the head housing 10.

The force flow passes over the flange 7.6 into the housing 10. In doing so, the flange 7.6 of the rolling bearing 7', which is designed as a ball bearing, is clamped in.

The axial surfaces 7.4' of the flange 7.6 can likewise be roughened, and thus provide more options when determining the preload or more security against undesirable movements of the ball bearing.

Since friction forces, in particular, which are formed perpendicular to the force flow, are transmitted with the roughening, the lower surface of the flange can also be roughened and the upper surface can be non-roughened. Both surfaces of the flange 7.6 would be in contact with the housing 10, but the roughened lower surface would transmit higher friction forces than the upward directed (non-roughened) surface.

The selective increase of the coefficients of friction of the abutment surfaces on the end face of the outer ring of the rolling bearings, of the counter surfaces in the housing, and if there is a further component, such as an adjustment washer, a wave spring washer or the like, between the housing and the rolling bearing, the increase in the coefficient of friction on the upper and lower side of this component reduces the movement of the movable parts in the bearing arrangement as well.

Therefore, the roughening of only the end face surface of the rolling bearing outer ring may suffice. The roughening of only the end face bearing surface in the housing may suffice as well.

The roughening of both sides of a component positioned between the ball bearing outer ring and the housing, such as, for example, an adjustment washer or a wave spring washer, may also suffice.

Combinations are possible as well. The roughening of the end face surface of the rolling bearing outer ring is thus possible in combination with the roughening of the end face bearing surface of the housing, and/or both rolling bearings can have roughened surfaces.

The roughening of the end face surface of the rolling bearing outer ring in combination with the roughening of the end face bearing surface of the housing and of additional components, such as an adjustment washer and/or wave spring washer, can also be used.

Instead of acting upon the roughness value of the surface of the components, a disc made of a material with a high coefficient of friction can be used between the end face of the outer ring and the housing. The material used is, in particular, PEEK or zirconium dioxide.

The invention claimed is:

1. A dental hand piece or angle piece comprising:
   a tool;
   a radial upper rolling bearing; and
   a radial lower rolling bearing;
   the tool is configured to be driven via a rotating drive element arranged in a housing, the rotating drive element is mounted in the housing by the radial upper rolling bearing and the radial lower rolling bearing, each rolling bearing having an axial abutment surface and the housing having mating surfaces formed by a corresponding axial countersurface that corresponds to the upper rolling bearing and another corresponding axial countersurface that corresponds to the lower rolling bearing, and the rolling bearings being axially preloaded relative to the housing via at least one spring element having axial contact surfaces,
   each rolling bearing having an outer ring with an end face which is at least partially designed as an axial abutment surface,
   an axial bearing arrangement of each outer ring of the rolling bearings taking place via the axial abutment surface on the outer ring, wherein the axial abutment surface of the upper rolling bearing directly abuts the corresponding axial countersurface in the housing and the axial abutment surface of the lower rolling bearing indirectly abuts said another corresponding axial countersurface in the housing with the interposition of the at least one spring element,
   wherein an optimal coefficient of friction for the static friction of the axial abutment surface on the end face of the outer ring of the upper rolling bearing to the corresponding axial countersurface and for the axial abutment surface on the end face of the outer ring of the lower rolling bearing and the another corresponding axial countersurface to the contact surfaces of the spring element are formed from an optimal coefficient of friction range by configuring one or more selected surfaces chosen from the list consisting of the axial abutment surfaces, the axial countersurface, the another axial countersurface, and the axial contact surfaces, to have a surface roughness having a profile depth of 8 µm-18 µm and/or a $R_z$ of 4 µm to 14 µm.

2. The dental hand piece or angle piece according to claim 1, wherein the optimal coefficient of friction it is at least 0.16 in the lubricated state or at least 0.25 in the unlubricated state.

3. The dental hand piece or angle piece according to claim 1, wherein both axial abutment surfaces on the end faces of the outer rings and (i) the axial countersurface and (ii) the another axial countersurface on the housing are roughened.

4. The dental hand piece or angle piece according to claim 1, wherein the optimal coefficient of friction is provided by selecting material pairs for said selected surfaces from a group of material pairs consisting of metal/metal, metal/ceramic, ceramic/ceramic, plastic/metal, and plastic/ceramic.

5. The dental hand piece or angle piece according to claim 1, wherein at least one of the axial abutment surface, the corresponding axial countersurface and the another corresponding axial countersurface is formed as part of a coating on a base material.

6. The dental hand piece or angle piece according to claim 1, Wherein each outer ring has a corresponding opposing end face located on an opposite side of said end face,
   wherein said corresponding opposing end face is not configured for transmission of axial force,
   wherein said corresponding opposing end face has a roughness less than the surface roughness of the one or more selected surfaces.

* * * * *